(12) United States Patent
Natsumeda et al.

(10) Patent No.: US 9,086,619 B2
(45) Date of Patent: Jul. 21, 2015

(54) OPTICAL DEVICE FOR PROJECTION DISPLAY DEVICE HAVING PLASMONS EXCITED WITH FLUORESCENCE

(75) Inventors: Masanao Natsumeda, Tokyo (JP); Shin Tominaga, Tokyo (JP); Masao Imai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 159 days.

(21) Appl. No.: 13/877,186

(22) PCT Filed: Aug. 10, 2011

(86) PCT No.: PCT/JP2011/068293
§ 371 (c)(1),
(2), (4) Date: Apr. 1, 2013

(87) PCT Pub. No.: WO2012/049905
PCT Pub. Date: Apr. 19, 2012

(65) Prior Publication Data
US 2013/0308102 A1 Nov. 21, 2013

(30) Foreign Application Priority Data
Oct. 15, 2010 (JP) .................................. 2010-232825

(51) Int. Cl.
*G03B 21/20* (2006.01)
*G02B 5/00* (2006.01)
(Continued)

(52) U.S. Cl.
CPC .............. *G03B 21/204* (2013.01); *G02B 5/008* (2013.01); *G02F 1/01* (2013.01); *B32B 27/18* (2013.01);
(Continued)

(58) Field of Classification Search
CPC .... G03B 21/14; G03B 21/20; G03B 21/2006; G03B 21/2013; G03B 21/2033; G03B 21/204; H04N 9/31; H04N 9/3161; H04N 9/3164; G02B 5/008; G02B 6/1226; G02B 2207/113; G02F 1/01; B82Y 20/00; B32B 27/18; C09K 11/00; C09K 11/08
USPC ............. 353/84–85, 94, 122; 362/84, 217.08, 362/230–231, 235–236, 260, 293
See application file for complete search history.

(56) References Cited

U.S. PATENT DOCUMENTS

2003/0184989 A1* 10/2003 Matsumoto et al. ............ 362/19
2006/0278888 A1* 12/2006 Kim et al. ...................... 257/103
(Continued)

FOREIGN PATENT DOCUMENTS

| JP | 2001067685 A | 3/2001 |
|---|---|---|
| JP | 2002063722 A | 2/2002 |

(Continued)

OTHER PUBLICATIONS

Jung-Hoon Soung, et al., "Large Enhancement of Fluorescence Efficiency from CdSe/ZnS Quantum Dots Induced by Resonant Coupling to Spatially Controlled Surface Plasmons", Nano Letters, vol. 5, No. 8, pp. 1557-1561, May 2005.
(Continued)

*Primary Examiner* — Jori S Reilly-Diakun
(74) *Attorney, Agent, or Firm* — Sughrue Mion, PLLC

(57) ABSTRACT

An optical device featuring high efficiency and luminance is provided. The optical device includes carrier generation layer that causes fluorescence to occur with incident light, plasmon excitation layer that excites first surface plasmons with said fluorescence, carrier generation layer being laminated on carrier generation layer, and exit layer that extracts the first surface plasmons or light that occurs on an opposite surface of carrier generation layer contact surface of plasmon excitation layer to the outside. Carrier generation layer contains metal particles that excite second surface plasmons with said incident light.

14 Claims, 7 Drawing Sheets

(51) Int. Cl.
*G02F 1/01* (2006.01)
*C09K 11/08* (2006.01)
*G03B 21/14* (2006.01)
*B82Y 20/00* (2011.01)
*F21V 8/00* (2006.01)
*B32B 27/18* (2006.01)
*G02F 2/02* (2006.01)

(52) U.S. Cl.
CPC .............. *B82Y 20/00* (2013.01); *C09K 11/08* (2013.01); *G02B 6/005* (2013.01); *G02B 2207/113* (2013.01); *G02F 2/02* (2013.01); *G02F 2202/30* (2013.01); *G03B 21/14* (2013.01)

(56) References Cited

U.S. PATENT DOCUMENTS

| | | | |
|---|---|---|---|
| 2007/0181889 A1* | 8/2007 | Orita | 257/79 |
| 2009/0121624 A1* | 5/2009 | D'Andrade et al. | 313/504 |
| 2011/0260602 A1* | 10/2011 | Lee et al. | 313/491 |
| 2012/0176766 A1* | 7/2012 | Natsumeda | 362/19 |
| 2012/0224148 A1* | 9/2012 | Natsumeda et al. | 353/20 |
| 2012/0314188 A1* | 12/2012 | Tominaga et al. | 353/20 |
| 2012/0314189 A1* | 12/2012 | Natsumeda et al. | 353/20 |
| 2013/0027675 A1* | 1/2013 | Natsumeda et al. | 353/88 |
| 2013/0033678 A1* | 2/2013 | Natsumeda et al. | 353/20 |
| 2013/0057938 A1* | 3/2013 | Natsumeda et al. | 359/230 |
| 2013/0107132 A1* | 5/2013 | Tominaga et al. | 348/744 |
| 2013/0308102 A1* | 11/2013 | Natsumeda et al. | 353/20 |
| 2014/0022818 A1* | 1/2014 | Natsumeda et al. | 362/607 |
| 2014/0139809 A1* | 5/2014 | Natsumeda et al. | 353/20 |
| 2014/0226196 A1* | 8/2014 | Natsumeda et al. | 359/241 |
| 2014/0226197 A1* | 8/2014 | Natsumeda et al. | 359/241 |

FOREIGN PATENT DOCUMENTS

| | | |
|---|---|---|
| JP | 2004-156911 A | 6/2004 |
| JP | 2005-524084 A | 8/2005 |
| JP | 2006-313667 A | 11/2006 |
| JP | 2006-330683 A | 12/2006 |
| JP | 2009-239217 A | 10/2009 |
| WO | 2011/040528 A1 | 4/2011 |
| WO | 2011/052387 A1 | 5/2011 |
| WO | 2011/104936 A1 | 9/2011 |
| WO | 2011/108138 A1 | 9/2011 |

OTHER PUBLICATIONS

Koichi Okamoto, et al. "Surface-plasmon enhanced bright emission from CdSe quantum-dot nanocrystals", J. Opt. Soc. Am. B, vol. 23, No. 8, pp. 1674-1678, Aug. 2006.

Tohishiro Nakamura, et al., "Enhancement of Dye Fluorescence by Gold Nanoparticles: Analysis of Particle Size Dependence", Japanese Journal of Applied Physics, vol. 44, No. 9A, pp. 6833-6837, Sep. 8, 2005.

Ehren Hwang, et al., "Surface Plasmon Polariton Enhanced Fluorescence from Quantum Dots on Nanostructured Metal Surfaces", American Chemical Society, Nano Letters, vol. 10, Jan. 29, 2010, pp. 813-820.

Koichi Okamoto, "Novel Light-Emitting Devices using Surface Plasmon Resonance", 2010 The Institute of Electronics Information and Communication Engineers Sogo Taikai, Electronics Koen Ronbunshu 1, Mar. 16, 2010, pp. S71-S72.

International Search Report of PCT Application No. PCT/JP2011/068293, mailed Nov. 22, 2011.

Chinese Office Action for CN Application No. 201180049777.1 issued on Feb. 3, 2015 with English Translation.

\* cited by examiner

OPTICAL DEVICE FOR PROJECTION DISPLAY DEVICE HAVING PLASMONS EXCITED WITH FLUORESCENCE

This application is a National Stage Entry of PCT/JP2011/068293 filed Aug. 10, 2011, which claims priority from Japanese Patent Application 2010-232825 filed Oct. 15, 2010, the contents of all of which are incorporated herein by reference, in their entirety.

TECHNICAL FIELD

The present invention relates to an optical device, a light source, and a projection type display device that use surface plasmons.

BACKGROUND ART

In recent years, surface plasmons have been gaining popularity in various fields such as light source devices and sensing devices (refer to Patent Literatures 1 to 3 and Non-Patent Literatures 1 and 2). Surface plasmons are a group of free electrons that vibrate in a metal. Surface plasmons are excited on a metal surface an interaction with light.

The inventors of the present patent application have proposed plasmon coupling and emitting devices that are optical devices using surface plasmons in Japanese Patent Application No. 2009-227331 and Japanese Patent Application No. 2010-047944 (they were not disclosed when applied) so as to provide light source devices having high luminance and high directivity.

In a plasmon coupling and emitting device, a phosphor layer, a metal layer, and an exit layer are successively laminated. In the phosphor layer, incident light emitted from a light emitting device causes fluorescence to occur. The fluorescence couples with free electrons that are contained in a metal layer. As a result, surface plasmons are excited on the metal surface. In the exit layer, the surface plasmons are converted into light having a predetermined exit angle. The light having a predetermined exit angle is emitted from the exit layer.

In the related art references as disclosed in the foregoing Japanese Patent Application No. 2009-227331 and Japanese Patent Application No. 2010-047944, the dielectric constants of the carrier generation layer and the exit layer are adjusted so as to improve the coupling efficiency of fluorescence and surface plasmons. As a result, the efficiency and luminance for a plasmon coupling and emitting device are highly improved.

RELATED ART LITERATURE

Patent Literature

Patent Literature 1: JP2004-156911A, Publication
Patent Literature 2: JP2005-524084A, Publication (translation version)
Patent Literature 3: JP2006-313667A, Publication

Non-Patent Literature

Non-Patent Literature 1: NANO LETT. Vol. 5, No. 8 pp. 1557-1561 (2005)
Non-Patent Literature 2: J. Opt. Soc. Am. B Vol. 23, No. 8 pp. 1674-1678 (2006)

SUMMARY OF THE INVENTION

Problem to be Solved by the Invention

If the coupling efficiency of fluorescence and surface plasmons is further highly improved, the efficiency and luminance for a plasmon coupling and emitting device could be further highly improved. Simulations that the inventor et al. of the present patent application conducted revealed that fluorescence that occurs in the range from 10 nm to several 10 nm from the front surface on the phosphor layer side of the metal layer couples with surface plasmons the most effectively. Thus, if the film thickness of the phosphor layer is set to be around several 10 nm, the coupling efficiency of fluorescence and surface plasmons could be further highly improved.

However, since the extinction coefficients of ordinary phosphor materials are not so high, a phosphor layer having a film thickness of around several 10 nm cannot sufficiently absorb incident light. Thus, the fluorescence conversion efficiency with which incident light is converted into fluorescence becomes low. Thus, if the film thickness of the phosphor layer is set to be around several 10 nm, although the coupling efficiency of fluorescence and surface plasmons improves, the fluorescence conversion efficiency of the phosphor layer would become lower. Thus, no further improvement in the efficiency and luminance of a plasmon coupling and emitting device can be expected.

An object of the present invention is to provide an optical device, a light source device, and a projection type display device that can further highly improve the efficiency and luminance.

Means that Solve the Problem

An optical device according to the present invention includes a phosphor layer that causes fluorescence to occur with incident light; a plasmon excitation layer that excites first surface plasmons with said fluorescence, said phosphor layer being laminated on said phosphor layer, and an exit section that extracts said first surface plasmons or light that occurs on an opposite surface of said phosphor layer contact surface of the plasmon excitation layer to the outside, wherein said phosphor layer contains metal particles that excite second surface plasmons with said incident light.

A light source device according to the present invention includes said optical device; and a light emitting device that emits light to said optical device.

A projection type display device according to the present invention includes said light source device; a modulation device that modulates light emitted from said light source device and emits the modulated light; and a projection optical system that projects light emitted from said modulation device so as to display an image corresponding to the modulated light.

Effect of the Invention

According to the present invention, the efficiency and luminance can be further highly improved.

MODES THAT CARRY OUT THE INVENTION

Figure 1:
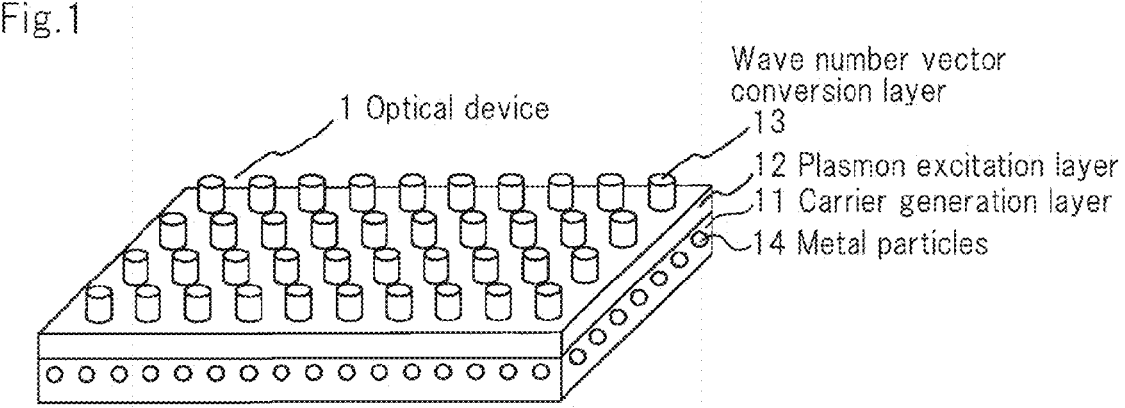
FIG. 1 is a perspective view schematically showing the structure of an optical device according to a first exemplary embodiment of the present invention.

Exemplary embodiments of the present invention will be described below with reference to the drawings. In the following description, similar sections having similar functions are denoted by similar reference numerals and their description will be omitted.

First Exemplary Embodiment

FIG. 1 is a perspective view schematically showing the structure of an optical device according to a first exemplary embodiment of the present invention. Since the individual layers of the optical device are very thin and their thicknesses largely differ, it is difficult to illustrate the exact size of the individual layers. Thus, the drawings do not illustrate the exact size the individual layers, but schematically illustrate them.

As shown in FIG. 1, optical device 1 according to the first exemplary embodiment has carrier generation layer 11 that light enters; plasmon excitation layer 12 laminated on carrier generation layer 11; and wave number vector conversion layer 13 laminated on plasmon excitation layer 12.

Carrier generation layer 11 is a phosphor layer that absorbs part of incident light and generates carriers (exciters) that cause fluorescence to occur.

Carrier generation layer 11 is made of for example an organic phosphor such as rhodamine 6G or sulforhodamine 101; an inorganic phosphor such as Y2O2S:Eu, BaMgAlxOy:Eu, or BaMgAlxOy:Mn; a quantum dot phosphor such as CdSe or CdSe/ZnS quantum dots; an inorganic material (semiconductor) such as GaN or GaAs; or an organic material (semiconductor material) such as (thiophene/phenylene) co-oligomer or Alq3. A plurality of phosphors having the same light emission frequency or different light emission frequencies may be contained in carrier generation layer 11. The thickness of carrier generation layer 11 is preferably 1 µm or less.

In addition, carrier generation layer 11 contains metal particles 14 that cause the apparent absorbance of incident light to increase. In this context, the apparent absorbance is an absorbance that is measured when light is caused to enter the entire surface of carrier generation layer 11 in which metal particles 14 are dispersed assuming that carrier generation layer 11 is a homogeneous layer. When metal particles 14 interact with incident light, surface plasmons are excited on the front surface of metal particles 14 and thereby an enhanced electric field that is nearly 100 times stronger than the intensity of the electric field of incident light is induced in the neighborhood of the front surface of metal particles 14. Since this enhanced electric field causes carriers to occur in carrier generation layer 11, the number of carriers that occur in carrier generation layer 11 increases. Thus, metal particles 14 cause the apparent absorbance of incident light to increase with the surface plasmons excited on their front surface and thereby causes an increase in the intensity of fluorescence.

Examples of the material of metal particles 14 include gold, silver, copper, platinum, palladium, rhodium, osmium, ruthenium, iridium, iron, tin, zinc, cobalt, nickel, chromium, titanium, tantalum, tungsten, indium, aluminum, and an alloy thereof. Among them, the material of metal particles 14 is preferably gold, silver, copper, platinum, aluminum, or an alloy that contains one of these metals as a primary component. The material of metal particles 14 is more preferably gold, silver, aluminum, or an alloy containing one of these metals as a primary component. Alternatively, the material of metal particles 14 may have a core-shell structure in which the type of a metal of the center is different from that of the neighborhood, a semi-sphere combining structure in which two types of semi-spheres are combined, or a cluster-in-cluster structure in which particles are made of different types of clusters. If metal particles 14 are made of an alloy or have a special structure, the plasmon resonance wave length can be controlled without it being necessary to change the size and shape of particles.

Metal particles 14 may be formed in any shape such as a rectangular parallelepiped, a cube, an ellipsoid, a sphere, a triangular pyramid, or a triangular prism as long as metal particles 14 have a closed shape. In addition, metal particles 14 include a structure in which a metal thin film is composed of closed surfaces each having a length of less than 10 µm according to a micromachining technique represented by a semiconductor lithography technique.

Plasmon excitation layer 12 is a particle layer or a thin film layer made of a metal material that has a plasma frequency higher than the frequency of fluorescence that occurs in carrier generation layer 11 (light emission frequency). In other words, plasmon excitation layer 12 is a particle layer or a thin film layer that has a negative dielectric constant at a light emitting frequency of fluorescence that occurs in carrier generation layer 11.

Plasmon excitation layer 12 excites surface plasmons on its front surface with fluorescence that occurs in carrier generation layer 11.

Surface plasmons that are excited on the front surface of plasmon excitation layer 12 exemplify first surface plasmons, whereas surface plasmons excited on the front surface of metal particles 14 exemplify second surface plasmons.

Examples of the material of plasmon excitation layer 12 include gold, silver, copper, platinum, palladium, rhodium, osmium, ruthenium, iridium, iron, tin, zinc, cobalt, nickel, chromium, titanium, tantalum, tungsten, indium, aluminum, and an alloy thereof. Among them, the material of plasmon excitation layer 12 is preferably gold, silver, copper, platinum, aluminum, or an alloy that contains one of these metals as a primary component. The material of plasmon excitation layer 12 is more preferably gold, silver, aluminum, or an alloy containing one of these metals as a primary component. Plasmon excitation layer 12 is preferably formed with a thickness of 200 nm or less. Plasmon excitation layer 12 is more preferably formed with a thickness in the range from 10 nm to 100 nm.

Wave number vector conversion layer 13 is an exit section that converts a wave number vector of surface plasmons excited on the interface of plasmon excitation layer 12 and wave number vector conversion layer 13 into light and extracts the light from the interface of plasmon excitation layer 12 and wave number vector conversion layer 13 so as to emit light from optical device 1. In other words, wave number vector conversion layer 13 converts surface plasmons into light having a predetermined exit angle such that optical device 1 emits the light at the predetermined exit angle. Namely, wave number vector conversion layer 13 causes optical device 1 to emit light in the direction nearly orthogonal to the interface of plasmon excitation layer 12 and wave number vector conversion layer 13.

Examples of wave number vector conversion layer 13 include a surface relief grating; a periodic structure represented by a photonic crystal or a quasi-periodic structure; a texture structure having a wavelength greater than that of light emitted from optical device 1; an uneven surface structure; a hologram; and a micro lens array. The quasi-periodic structure represents an imperfect periodic structure in which a periodic structure is partly lost. Among them, a periodic structure represented by a photonic crystal, a quasi-periodic structure, or a micro-lens array is preferably used. They can not only improve the light extraction efficiency, but also control the directivity. If a photonic crystal is used, a triangular grating crystalline structure is preferably used. Wave number vector conversion layer 13 may be formed in such a manner that a convex portion is formed on a planar substrate.

Next, metal particles 14 and their arrangements will be described in detail.

Figure 2:
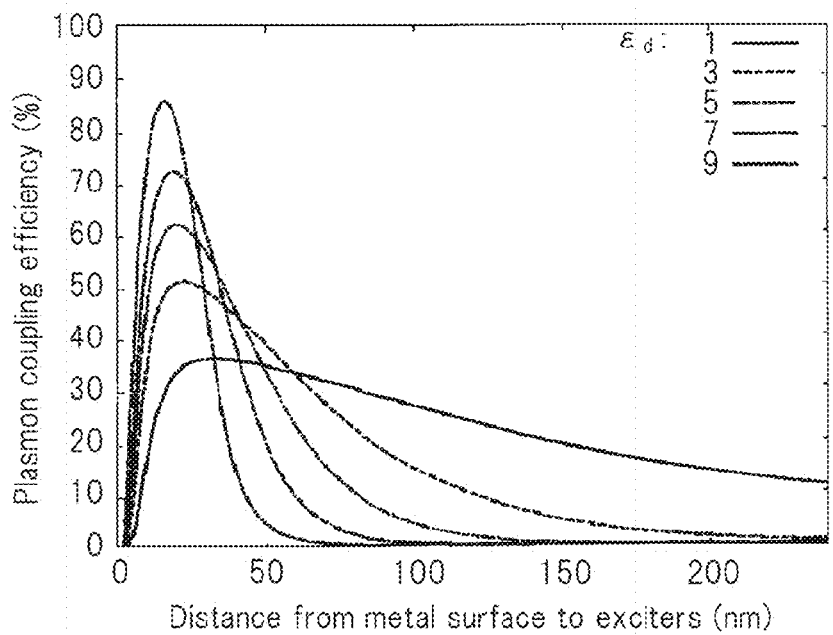
FIG. 2 is a schematic diagram showing the relationship between the distance from metal (Ag) surface to exciters and coupling efficiency.
Figure 3:
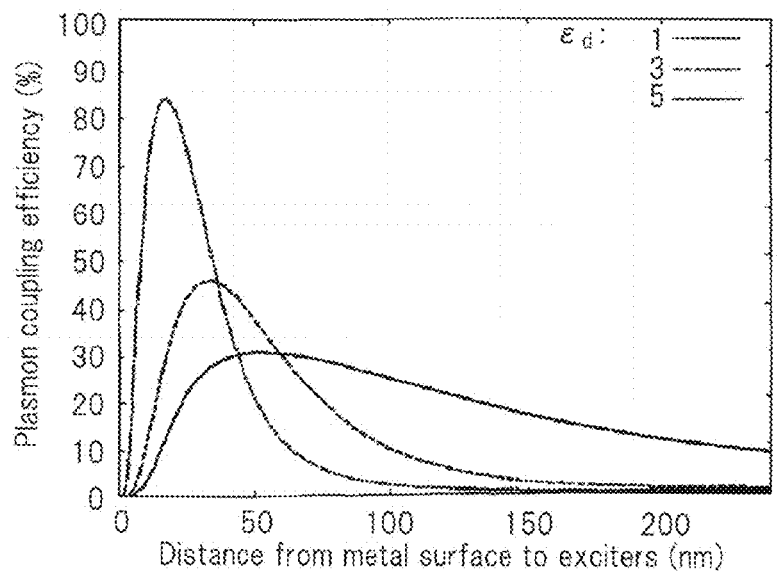
FIG. 3 is a schematic diagram showing the relationship between the distance from metal (Au) surface to exciters and coupling efficiency.

FIG. 2 and FIG. 3 show the relationship between the distance from metal surface to exciters and plasmon coupling efficiency based on each dielectric constant $\in_d$ of the dielectric layer (in this exemplary embodiment, carrier generation layer 11) that contacts plasmon excitation layer 12 in the case that metal particles 14 are absent. The distance from metal surface to exciters is the distance from carriers where occur in carrier generation layer 11 to the interface of carrier generation layer 11 and plasmon excitation layer 12. On the other hand, the plasmon coupling efficiency is a coupling efficiency for fluorescence that occur with carriers and surface plasmons excited in plasmon excitation layer 12. In FIG. 2, plasmon excitation layer 12 is Ag. In FIG. 3, plasmon excitation layer 12 is Au. In FIG. 2 and FIG. 3, the wave length of fluorescent is 530 nm.

As shown in FIG. 2 and FIG. 3, the peak value of plasmon coupling efficiency is proportional to the dielectric constant $\in_d$ and is reversely proportional to the full width at are half the maximum of the coupling efficiency. To improve the efficiency of optical device 1, the dielectric constant $\in_d$ needs to be relatively large and carrier generation layer 11 needs to absorb light in a region where the coupling efficiency is high. In this case, the width of the region where carrier generation layer 11 absorbs light (the distance from metal surface to exciters) is preferably in the order of several 10 nm.

However, a phosphor having an ordinary extinction coefficient cannot fully absorb light in a narrow region on the order of several 10 nm. Assuming that the extinction coefficient of a phosphor is 0.2 and the wave length of light to be absorbed is 405 nm, the film thickness of the phosphor needs to be around 160 nm.

To solve this problem, according to this exemplary embodiment, carrier generation layer 11 contains metal particles 14 so as to improve the absorptivity in the region where the coupling efficiency is high using the field enhancement effect of surface plasmons that occur in metal particles 14.

To cause surface plasmons on the front surface of metal particles 14, the radius of metal particles 14 needs to be sufficiently smaller than the wave length of light that enters carrier generation layer 11. For example, if visible light enters carrier generation layer 11, the radius of metal particles is preferably in the range from several nm to several ten nm.

Moreover, assuming that the thickness of carrier generation layer 11 is around 1 μm, since the width of the region where coupling efficiency is high is in the order of several ten nm, the concentration of metal particles 13 in the plasmon excitation layer 12 side region that is apart from the center of carrier generation layer 11 is preferably greater than that in the opposite side region of plasmon excitation layer 12 that is apart from the center of carrier generation layer 11. In addition, metal particles 14 are preferably dispersed only in the plasmon excitation layer 12 side region that is apart from the center of carrier generation layer 11. For example, assuming that the radius of metal particles 14 is in a range from several nm to several 10 nm, the region where metal particles 14 are present are preferably limited in the range from 5 nm that is apart from the interface of carrier generation layer 11 and plasmon excitation layer 12 plus one half of the radius of metal particles 14 to 100 nm.

It is known that if metal particles are periodically arranged, surface plasmons have a strong field enhancement effect and thereby the electric field is further intensified. Thus, it is preferred to adjust the interval of metal particles such that they are periodically arranged.

As described above, according to this exemplary embodiment, carrier generation layer 11 contains metal particles 14 that excite surface plasmons with incident light. The surface plasmons that are excited on metal particles 14 increase the intensity of fluorescence. Thus, since the fluorescence conversion efficiency of carrier generation layer 11 can be increased, the efficiency and luminance can be highly improved.

In addition, according to this exemplary embodiment, metal particles 14 are dispersed on the plasmon excitation layer 12 side of carrier generation layer 11. Thus, absorptivity in the region where the coupling efficiency is high can be improved. As a result, the coupling efficiency of fluorescence and surface plasmons can be improved. Consequently, the efficiency and luminance can be further highly improved.

Second Exemplary Embodiment

Next, a light source device that has optical device 1 according to a second exemplary embodiment of the present invention will be exemplified.

Figure 4:
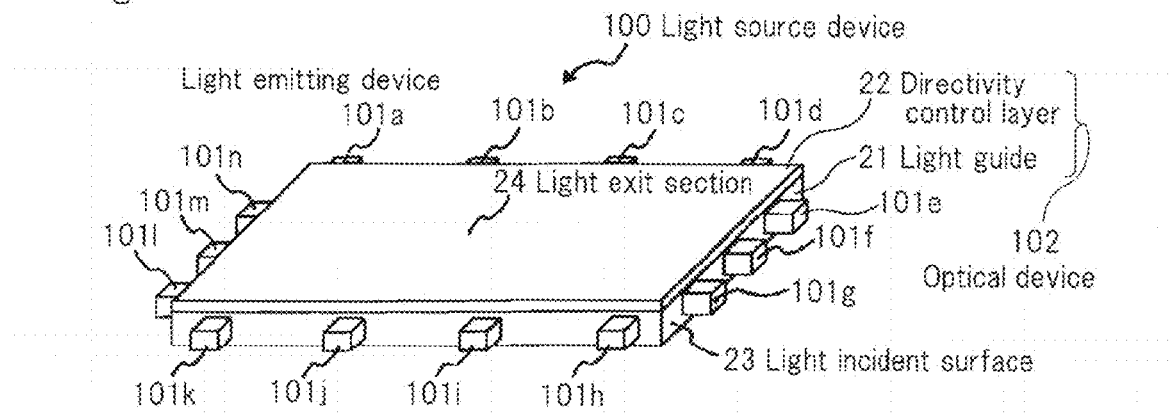
FIG. 4 is a perspective view schematically showing the structure of an optical device according to a second exemplary embodiment of the present invention.
Figure 5:
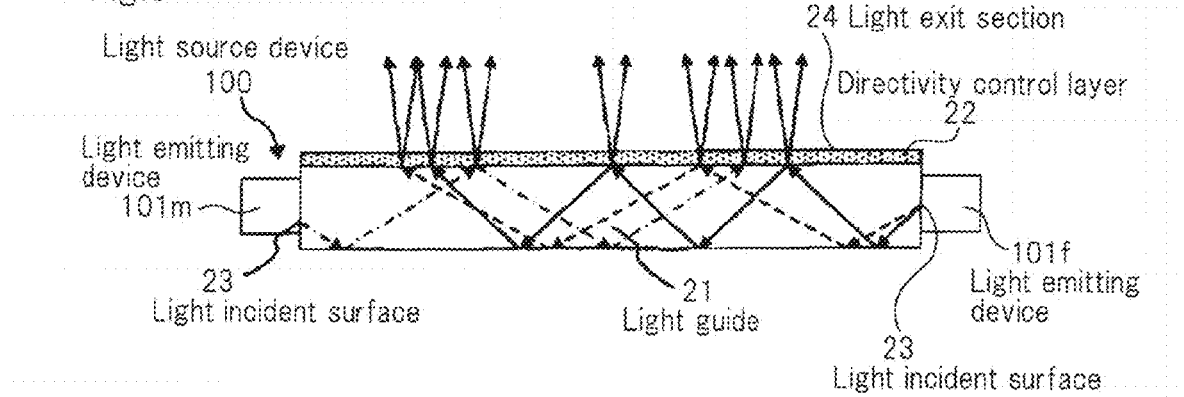
FIG. 5 is a sectional view describing how light acts in a light source device according to the second exemplary embodiment of the present invention.

FIG. 4 is a perspective view schematically showing the structure of the light source device according to this exemplary embodiment. FIG. 5 is a sectional view describing how light acts in the light source device according to this exemplary embodiment.

As shown in FIG. 4 and FIG. 5, light source device 100 according to this exemplary embodiment has a plurality of light emitting devices 101 (101a to 101n) and optical device 102 into which light emitted from light emitting devices 101 enters. Optical device 102 has light guide 21 into which light emitted from light emitting devices 101 enters and directivity control layer 22 that emits light that exits from light guide 21 to the outside.

According to this exemplary embodiment, light emitting devices 101a to 101n are arranged at a predetermined interval on four side surfaces of planar light guide 21. The surfaces where light emitting devices 101a to 101n are connected to the foregoing side surfaces are referred to as light incident surfaces 23. Light emitting devices 101 are, for example, light emitting diodes (LEDs), laser diodes, super luminescent diodes, or the like that emit light having a wave length that carrier generation layer 11 can absorb. Light emitting devices 101 may be located apart from light incident surfaces 23 of light guide 21. For example, light emitting devices 101 may be optically connected to light guide 21 using light guide members such as light pipes.

According to this exemplary embodiment, light guide 21 is formed in a planar shape. However, the shape of light guide 21 is not limited to a planar shape. Light guide 21 may have a structure that controls luminous intensity distribution characteristics such as a micro-prism. A reflection film (not shown) may be formed entirely or partly on an outer circumferential surface of light guide 21 excluding light exit section 24 and light incident surfaces 23. Likewise, a reflection film (not shown) may be formed entirely or partly on an outer circumferential surface of light source device 100 excluding light exit section 24 and light incident surfaces 23. The reflection film may be made of, for example, a metal material such as silver or aluminum or a dielectric laminate film.

Figure 6:
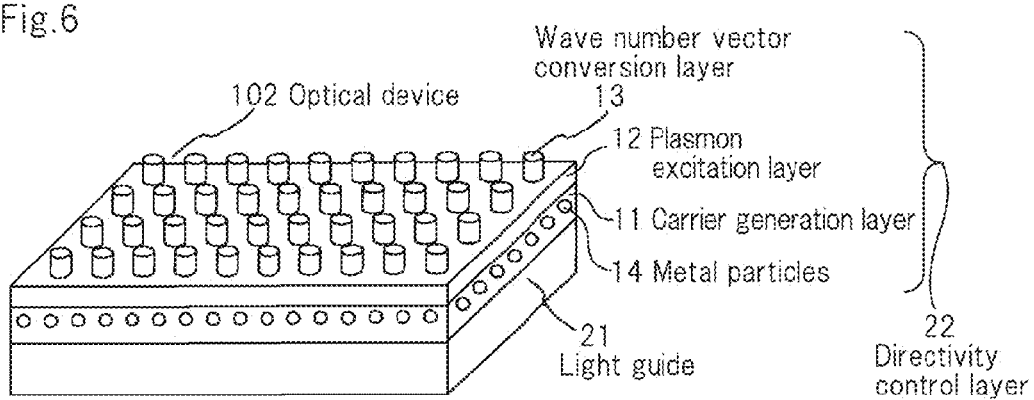
FIG. 6 is a schematic diagram showing a directivity control layer of the light source device according to the second exemplary embodiment of the present invention.

Directivity control layer 22 is a layer that serves to improve the directivity of light that is emitted from light source device 100. As shown in FIG. 6, directivity control layer 22 has the same structure as optical device 1 shown in FIG. 1. In FIG. 6, carrier generation layer 11 is located immediately above light guide 21. Although wave number vector conversion layer 13 is located immediately above plasmon excitation layer 12, a dielectric layer whose thickness is less than 1 μm may be inserted between wave number vector conversion layer 13 and plasmon excitation layer 12.

Plasmon excitation layer 12 is sandwiched between two layers each having dielectricity. According to this exemplary embodiment, these two layers correspond to carrier generation layer 11 and wave number vector conversion layer 13. Optical device 102 according to this exemplary embodiment is structured such that the effective dielectric constant of an incident side portion including an entire structure laminated on the light guide 21 side of plasmon excitation layer 12 (hereinafter simply referred to as the incident side portion) is greater than that of an exit side portion including an entire structure laminated on the wave number vector conversion layer 13 side of plasmon excitation layer 12 and a medium (for example, air) that comes into contacts with wave number vector conversion layer 13 (hereinafter simply referred to as the exit side portion). The entire structure laminated on the light guide 21 side of plasmon excitation layer 12 includes light guide 21. The entire structure laminated on the wave number vector conversion layer 13 side of plasmon excitation layer 12 includes wave number vector conversion layer 13.

In other words, according to the first exemplary embodiment, the effective dielectric constant of the incident side portion including light guide 21 and carrier generation layer 11 of plasmon excitation layer 12 is greater than that of the exit side portion including wave number vector conversion layer 13 and the medium of plasmon excitation layer 12. In this case, surface plasmons occur on the opposite side surface of the phosphor layer 11 that contacts surface of plasmon excitation layer 12.

More specifically, the real part of the complex effective dielectric constant of the incident side portion (light emitting devices 101 side) of plasmon excitation layer 12 is set to be greater than the real part of the complex effective dielectric constant of the exit side portion (wave number vector conversion layer 13 side) of plasmon excitation layer 12.

Assuming that directions that are parallel with an interface of plasmon excitation layer 12 are denoted by x and y axes; the direction perpendicular to the interface of plasmon excitation layer 12 is denoted by z axis; the angular frequency of fluorescence emitted from carrier generation layer 11 is denoted by w; the dielectric constant distribution of a dielectric substance at the incident side portion and exit side portion of plasmon excitation layer 12 is denoted by $\in(\omega, x, y, z)$; the z component of the wave number of surface plasmons is denoted by $k_{spp,z}$; and an imaginary unit is denoted by j, then a complex effective dielectric constant $\in_{eff}$ can be expressed as follows.

[Mathematical Expression 1]

$$\varepsilon_{eff} = \frac{\int\int\int_D \varepsilon(\omega, x, y, z)\exp(2jk_{spp,z}z)}{\int\int\int_D \exp(z)} \quad \text{Formula (1)}$$

The integration range D is a range of three dimensional coordinates of the incident side portion or exit side portion of plasmon excitation layer 12. In other words, the ranges in the directions of the x axis and y axis in the integration range D are ranges that do not include a medium on the outer circumferential surface of the structure that the incident side portion or exit side portion includes, but are ranges that include the outer edge of a surface in parallel with the interface of plasmon excitation layer 12. On the other hand, the range in the direction of the z axis in the integration range D is the range of the incident side portion or exit side portion (including the medium). When the effective dielectric constants of the incident side portion and exit side portion are calculated, with respect to the Z coordinate, the interface of plasmon excitation layer 12 and the layer that comes into contact with plasmon excitation layer 12 are defined as Z=0 and the direction that is apart from the interface is defined as (+) Z direction.

On the other hand, assuming that the real part of the dielectric constant of plasmon excitation layer 12 is denoted by $\in_{metal}$ and the wave number of light in vacuum is denoted by $k_0$, the z component of the wave number of surface plasmons, $k_{spp,z}$, and the x and y components of the wave number of the surface plasmons, $k_{spp}$, can be expressed as follows.

[Mathematical Expression 2]

$$k_{spp,z} = \sqrt{\varepsilon_{\mathit{eff}} k_0^2 - k_{spp}^2} \quad \text{Formula (2)}$$

[Mathematical Expression 3]

$$k_{spp} = k_0 \sqrt{\frac{\varepsilon_{\mathit{eff}} \varepsilon_{metal}}{\varepsilon_{\mathit{eff}} + \varepsilon_{metal}}} \quad \text{Formula (3)}$$

Thus, by substituting a dielectric constant distribution $\in_{in}$ (ω, x, y, z) of the incident side portion of plasmon excitation layer 12 and the dielectric constant distribution $\in_{out}$ (ω, x, y, z) of the exit side portion of plasmon excitation layer 12 for a dielectric constant distribution $\in$(ω, x, y, z) into Formula (1), Formula (2), and Formula (3), a complex effective dielectric layer $\in_{\mathit{effin}}$ of the incident side portion of plasmon excitation layer 12 and a complex effective dielectric constant $\in_{\mathit{effout}}$ of the exit side portion of plasmon excitation layer 12 are obtained. In practice, by giving an appropriate initial value as a complex effective dielectric constant $\in_{\mathit{eff}}$ and iteratively calculating Formula (1), Formula (2) and Formula (3), the complex effective dielectric constant $\in_{\mathit{eff}}$ can be easily obtained. If the dielectric constant of the layer that comes into contacts with plasmon excitation layer 12 is very large, the z component $k_{spp,z}$ of the wave number of the surface plasmons on the interface becomes a real number. This means that no surface plasmons occur on the interface. Thus, the dielectric constant of the layer that comes into contact with plasmon excitation layer 12 corresponds to the effective dielectric constant in this case.

Assuming that the effective interaction distance of surface plasmons is a distance for which the intensity of surface plasmons becomes $e^{-2}$, the effective interaction distance $d_{\mathit{eff}}$ of the surface plasmons

[Mathematical Expression 4]

$$d_{\mathit{eff}} = \operatorname{Im}\left[\frac{1}{k_{spp,z}}\right] \quad \text{Formula (4)}$$

can be expressed as above.

The imaginary part of the complex dielectric constant of both any layer including light guide 21 but excluding carrier generation layer 11 and plasmon excitation layer 12 and the medium that come into contact with wave number conversion layer 13 is preferably as small as possible. When the imaginary part of the complex dielectric constant is set to be as small as possible, plasmon coupling is managed to easily occur so as to reduce optical loss.

The ambient medium of light source device 100, namely the medium that comes into contact with light guide 21 and wave number vector conversion layer 13, may be either solid, liquid, or gaseous. In addition, the ambient medium on the light guide 21 side may be different from that on the wave number vector conversion layer 13 side.

Next, how light that is entered from light emitting devices 101 into directivity control layer 22 and then emitted from light exit section 24 of directivity control layer 22 in light source device 100 will be described.

As shown in FIG. 5, light emitted from one of light emitting devices 101, for example, light emitting device 101f is transmitted through light incident surface 23 of light guide 21 and propagates to light exit section 24 while light is being totally reflected in light guide 21. At this point, part of light that enters the interface of light guide 21 and directivity control layer 22 exits from light exit section 24 as light that has a wave length and in a direction corresponding to the characteristics of plasmon excitation layer 12 in directivity control layer 22 that will be described later. Light that does not exit from light exit section 24 returns to light guide 21. Thereafter, part of light that enters the interface of light guide 21 and directivity control layer 22 is transmitted through directivity control layer 22 and then exit from light exit section 24. These operations are repeated and thereby most of light that enters light guide 21 exits from light exit section 24. Likewise, light emitted from light emitting device 101m located opposite to light emitting device 101f through light guide 21 and then is transmitted through light incident surface 23 and exits from light exit section 24. The direction and wave length of light that exits from light exit section 24 depend only on the characteristics of directivity control layer 22, not the positions of light emitting devices 101 and the incident angle of light to the interface of light on guide 21 and directivity control layer 22. Unless otherwise specified, the structure having wave number vector conversion layer 13 made of a photonic crystal will be described.

Light propagates to light exit section 24 while it is being totally reflected in light guide 21. However, the condition in which light is totally reflected is lost on the interface of light guide 21 and carrier generation layer 11. Thus, light enters carrier generation layer 11 on the interface with light guide 21.

When light enters carrier generation layer 11, the light causes carriers to occur in carrier generation layer 11 and surface plasmons to be excited on the front surface of metal particles 14. The surface plasmons exited on the front surface of metal particles 14 induces an enhanced electric field that is nearly 100 times greater than that of light that enters carrier generation layer 11 because of the field enhancement effect. This enhanced electric field also causes carriers to occur in carrier generation layer 11.

Carriers that occur in carrier generation layer 11 generate fluorescence. The fluorescence couples with free electrons in plasmon excitation layer 12. As a result, surface plasmons are excited on the interface of plasmon excitation layer 12 and wave number vector conversion layer 13. The excited surface plasmons are diffracted by wave number vector conversion layer 13 and then exit to the outside of light source device 100.

If the dielectric constant on the interface of plasmon excitation layer 12 and wave number vector conversion layer 13 is spatially uniform, namely if the interface is a plane surface, surface plasmons that occur on the interface cannot be extracted. Thus, according to the present invention, surface plasmons are diffracted by wave number vector conversion layer 13 that has a periodic structure so as to extract them as light. Light that exits from one point of wave number vector conversion layer 13 has a circular intensity distribution in which light spreads in a concentric circle shape as it propagates.

If wave number vector conversion layer 13 has a periodic structure, assuming that a pitch of the periodic structure of wave number vector conversion layer 13 is denoted by Λ; x and y components of the wave number of surface plasmons on the wave number vector conversion layer side of plasmon excitation layer 12 are denoted by $k_{sppout}$; the dielectric constant of the ambient medium is denoted by $\in_m$; and the wavelength of light in vacuum that exits from wave number vector conversion layer 13 is denoted by $k_0$, the center exit angle $\theta_{rad}$ of light that exits from wave number vector conversion layer 13 can be represented by the following formula.

[Mathematical Expression 5]

$$\theta_{rad} = \mathrm{Sin}^{-1}\left[\frac{k_{sppout} - i\frac{2\pi}{\Lambda}}{k_0 \mathrm{Re}[\varepsilon_m]}\right]$$

Formula (5)

where i is a positive or negative integer.

As described above, in light source device 100 according to this exemplary embodiment, since optical device 1 converts light emitted from light emitting devices 101, the efficiency and luminance for light source device 100 can be highly improved.

Third Exemplary Embodiment

Figure 7:
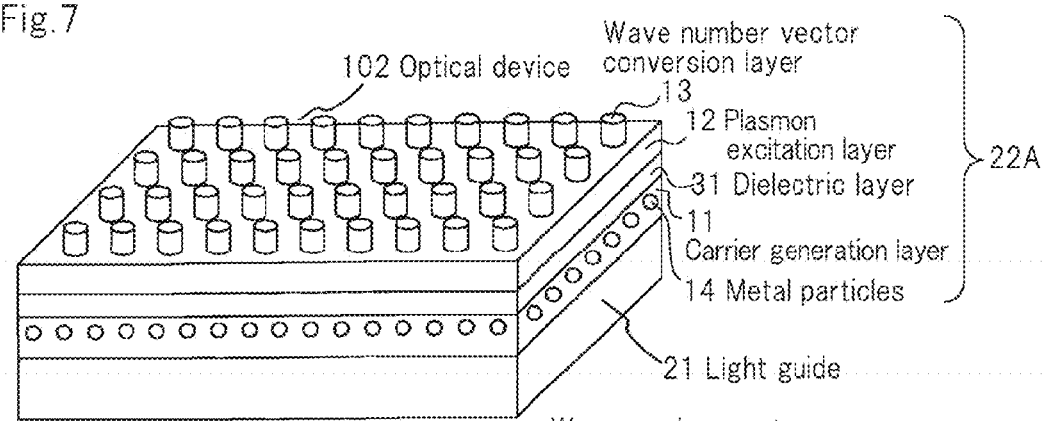
FIG. 7 is a schematic diagram showing a directivity control layer of a light source device according to a third exemplary embodiment of the present invention.

FIG. 7 is a perspective view showing a directivity control layer of a light source device according to a third exemplary embodiment of the present invention. As shown in FIG. 7, according to the third exemplary embodiment, carrier generation layer 11, dielectric layer 31, plasmon excitation layer 12, and wave number vector conversion layer 13 are successively laminated on directivity control layer 22A and light guide 21. Thus, the light source device of the third exemplary embodiment is different from that of the second exemplary embodiment in that dielectric layer 31 is inserted between carrier generation layer 11 and plasmon excitation layer 12.

The dielectric constant of dielectric layer 31 is kept in the range in which the effective dielectric constant of the exit side portion of plasmon excitation layer 12 is lower than that of the incident side portion thereof. Thus, the dielectric constant of dielectric layer 31 does not need to be greater than the effective dielectric constant of the exit siplasmon excitation layer 12.

Dielectric layer 31 may be made of a material that is different from that of carrier generation layer 11. Thus, according to this exemplary embodiment, the material of carrier generation layer 11 can be selected with a high degree of freedom.

Dielectric layer 31 is preferably a thin film or a porous film made of a material having a high dielectric constant such as diamond, $TiO_2$, $CeO_2$, $Ta_2O_5$, $ZrO_2$, $Sb_2O_3$, $HfO_2$, $La_2O_3$, $NdO_3$, $Y_2O_3$, ZnO, and $Nb_2O_5$. In addition, dielectric layer 31 is preferably made of a material having conductivity. Moreover, the thickness of dielectric layer 31 is preferably as small as possible. The allowable maximum value of the thickness corresponds to the distance for which plasmon coupling occurs between carrier generation layer 11 and plasmon excitation layer 12. The allowable maximum value of the thickness can be calculated using Formula (4).

In directivity control layer 22A, the effective dielectric constant of the incident side portion including light guide 21, carrier generation layer 11, and dielectric layer 31 is set to be greater than that of the exit side portion including wave number vector conversion layer 13 and the medium that comes into contact with wave number vector conversion layer 13 such that plasmon coupling occurs in plasmon excitation layer 12.

A dielectric layer (not shown) may be inserted between plasmon excitation layer 12 and wave number vector conversion layer 13. However, the dielectric constant of the dielectric layer is kept in the range in which the effective dielectric constant of the exit side portion of plasmon excitation layer 12 is lower than that of the incident side portion thereof. Thus, the dielectric constant of dielectric layer 31 does not need to be lower than the effective dielectric constant of the incident side portion of plasmon excitation layer 12. The dielectric layer is preferably made of for example a $SiO_2$ nano-rod array film, a thin film or a porous film of $SiO_2$, $AlF_3$, $MgF_2$, $NaF_6$, NaF, LiF, $CaF_2$, $BaF_2$, or plastic having a low dielectric constant.

Directivity control layer 22A according to the third exemplary embodiment can have the same effect as the first exemplary embodiment. In addition, since directivity control layer 22A has dielectric layer 31 that is an independent dielectric layer, the effective dielectric constant of the incident side portion of plasmon excitation layer 12 can be easily adjusted.

Fourth Exemplary Embodiment

Figure 8:
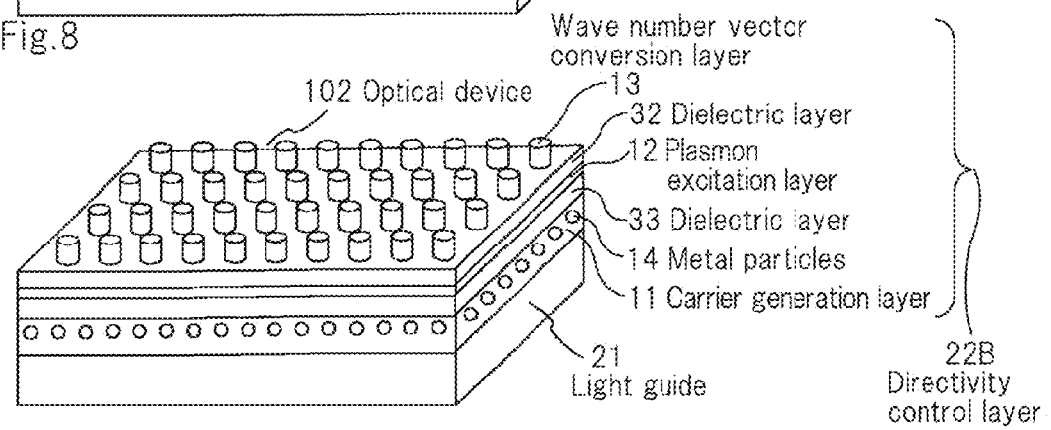
FIG. 8 is a schematic diagram showing a directivity control layer of a light source device according to a fourth exemplary embodiment of the present invention.

FIG. 8 is a perspective view showing a directivity control layer of a light source device according to a fourth exemplary embodiment of the present invention. As shown in FIG. 8, directivity control layer 22B according to the fourth exemplary embodiment has not only the structure of directivity control layer 22 shown in FIG. 6, but also has dielectric layer 32 that is sandwiched between plasmon excitation layer 12 and wave number vector conversion layer 13 and dielectric layer 33 that is sandwiched between carrier generation layer 11 and plasmon excitation layer 12. The dielectric constant of dielectric layer 33 is preferably lower than that of dielectric layer 32.

The dielectric constant of dielectric layer 32 and dielectric layer 33 is kept in the range in which the effective dielectric constant of the incident side portion of plasmon excitation layer 12 is lower than that of the exit side portion thereof. Thus, the dielectric constant of dielectric layer 32 does not need to be greater than the effective dielectric constant of the incident side portion of plasmon excitation layer 12. In addition, the dielectric constant of dielectric layer 33 does not need to be lower than the effective dielectric constant of the exit side portion of plasmon excitation layer 12.

In this case, light occurs on the opposite side surface of the phosphor layer 11 contact surface of plasmon excitation layer 12 and surface plasmons occur on the phosphor layer 11 side surface of plasmon excitation layer 12.

The imaginary part of the dielectric constant of each of dielectric layer 32 and dielectric layer 33 is preferably as low as possible. When the imaginary part of the complex dielectric constant is set to be as low as possible, since plasmon coupling easily occurs, optical loss is decreased.

Dielectric layer 33 is preferably made of, for example, a $SiO_2$ nano-rod array film, a thin film or a porous film of $SiO_2$, $AlF_3$, $MgF_2$, $Na_3AlF_6$, NaF, LiF, $CaF_2$, $BaF_2$, or a plastic having low dielectric constant. In addition, dielectric layer 32 is preferably made of a material having a high dielectric constant such as diamond, $TiO_2$, $CeO_2$, $Ta_2O_5$, $ZrO_2$, $Sb_2O_3$, $HfO_2$, $La_2O_3$, $NdO_3$, $Y_2O_3$, ZnO, or $Nb_2O_5$.

As described above, when dielectric layers 32 and 33 are added, the effective dielectric constant on the exit side of plasmon excitation layer 12 becomes greater than that on the incident side thereof. In this case, fluorescence that occurs in carrier generation layer 11 couples with electrons in plasmon excitation layer 12 and excites surface plasmons as plasmon coupling. Plasmon excitation layer 12 converts the surface plasmons into light. The light exits from the dielectric layer 32 side of plasmon excitation layer 12. The wave number vector conversion layer diffracts the light and then emits the light to the outside of directivity control layer 22B. If wave number vector conversion layer 13 has a periodic structure, like the first exemplary embodiment, assuming that the pitch of the periodic structure of wave number vector conversion layer 13 is denoted by Λ; the x and y components of the wave number of surface plasmons on the carrier generation layer 11 side of plasmon excitation layer 12 are denoted by $k_{sppin}$; the dielectric constant of the ambient medium is denoted by $\in_m$; and the wavelength of light in vacuum that exits from wave number vector conversion layer 13 is denoted by $k_0$, then the center exit angle $\theta_{rad}$ of light that exits from wave number vector conversion layer 13 can be represented by the following formula.

[Mathematical Expression 6]

$$\theta_{rad} = \mathrm{Sin}^{-1}\left[\frac{k_{sppout} - i\frac{2\pi}{\Lambda}}{k_0 \mathrm{Re}[\varepsilon_m]}\right] \quad \text{Formula (6)}$$

where i is a positive or negative integer.

If the effective dielectric constant of the incident side portion of plasmon excitation layer 12 is kept to be lower than that of the exit side portion thereof, even if layers 32 or 33 is omitted or even if both of layers 32 and 33 are omitted, light source device 100 operates.

As described above, in the light source device according to this exemplary embodiment, since the incident angle of light that enters wave number vector conversion layer 13 just depends on plasmon excitation layer 12 and the dielectric constants of dielectric layers 32 and 33 that sandwich plasmon excitation layer 8, the directivity of light emitted from the light source device is not restricted by the directivities of light emitting devices 101.

Fifth Exemplary Embodiment

Figure 9:
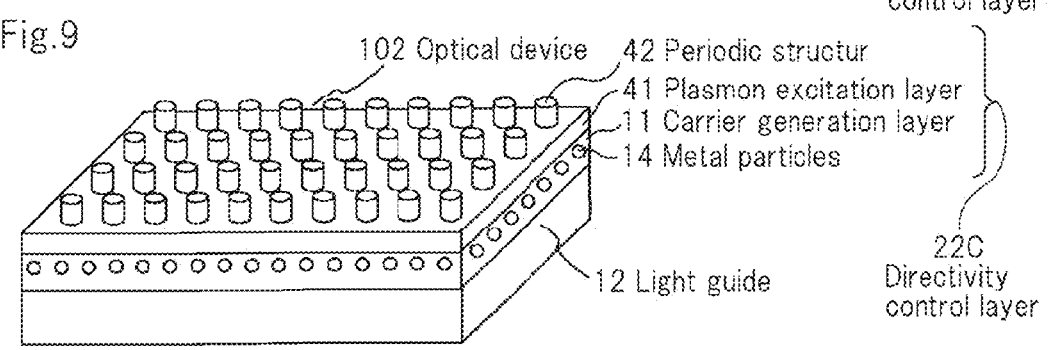
FIG. 9 is a schematic diagram showing a directivity control layer of a light source device according to a fifth exemplary embodiment of the present invention.
Figure 10:
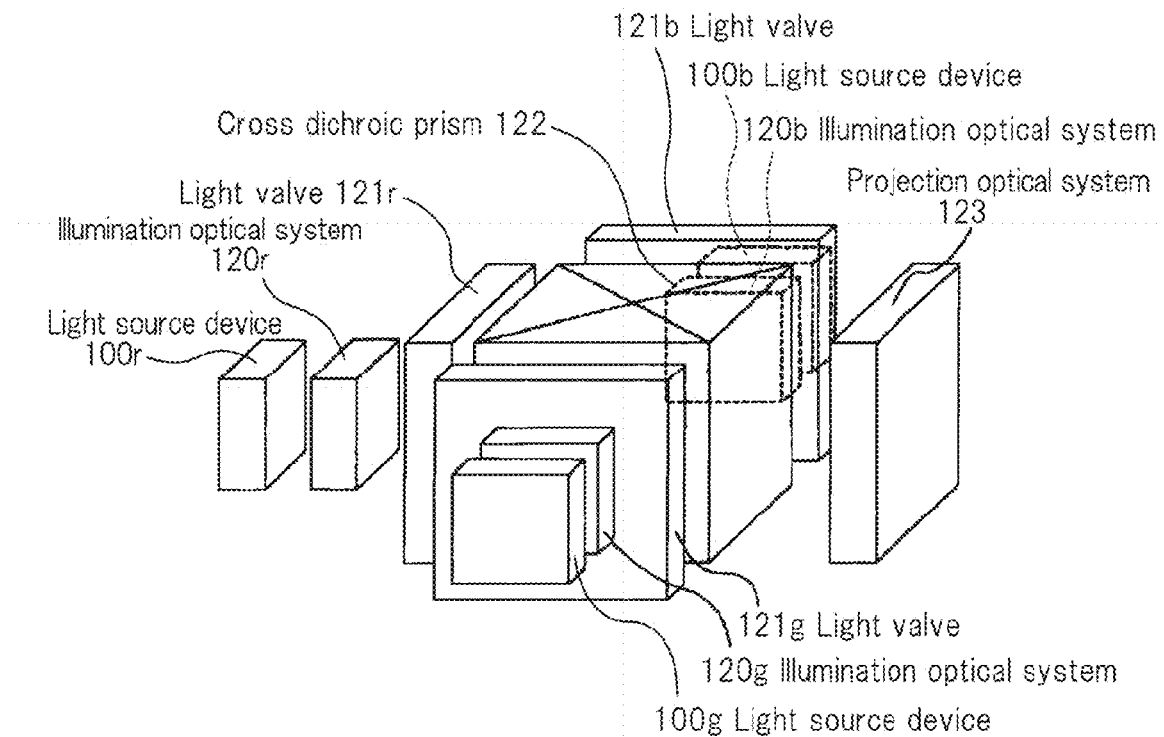
FIG. 10 is a schematic diagram showing a projection type display device according to a sixth exemplary embodiment of the present invention.

FIG. 9 is a perspective view showing a directivity control layer of a light source device according to a fifth exemplary embodiment of the present invention. As shown in FIG. 9, directivity control layer 22C according to the fifth exemplary embodiment has a structure in which carrier generation layer 11 and plasmon excitation layer 41 are successively laminated on plasmon excitation layer 12.

Plasmon excitation layer 41 according to the fifth exemplary embodiment is different from plasmon excitation layer 12 according to the first exemplary embodiment in that periodic structure 42 that has a function of wave number vector conversion layer 13 (namely, a function as an exit section) is formed on the opposite side surface of the carrier generation layer 11 contact surface. Periodic structure 42 is made of a one-dimensional or two-dimensional grating (concave and convex structure).

Periodic structure 42 may be any periodic structure having for example a sin wave shape, a saw wave shape, a triangular wave shape, a square wave shape or a stepwise shape thereof. Alternatively, a periodic structure may be formed on the opposite side surface of the periodic structure 42 side surface of plasmon excitation layer 41.

When light enters carrier generation layer 11, surface plasmons occur on the interface of carrier generation layer 11 and plasmon excitation layer 41. The surface plasmons are extracted from plasmon excitation layer 41 as light that is emitted in a predetermined direction.

More specifically, assuming that the angular frequency of fluorescence in vacuum that occurs in carrier generation layer 11 is denoted by ω, the light speed in vacuum is denoted by c, the dielectric constant of plasmon excitation layer 41 is denoted by $\in_{metal}$, the dielectric constant of carrier generation layer 11 is denoted by $\in_{sub}$, the dielectric constant of the medium that comes into contact with plasmon excitation layer 41 is denoted by $\in_{medi}$, the wave number of surface plasmons on the interface between plasmon excitation layer 41 and the medium that contacts thereof is denoted by $k_{spp.medi}$, the wave number of surface plasmons on the interface between carrier generation layer 11 and plasmon excitation layer 41 is denoted by $k_{spp.sub}$, the wave number vector in the x direction of periodic structure 42 of plasmon excitation layer 41 is denoted by $K_x$, and the wave number vector in the y direction of periodic structure 42 of plasmon excitation layer 41 is denoted by $K_y$ (where the xy plane is a plane in parallel with substrate 21), then light is emitted from plasmon excitation layer 41 in the direction of angle θ that satisfies Formula (7).

[Mathematical Expression 7]

$$k_{spp,medi} + mK_x + nK_y = \frac{\omega}{c}\sqrt{\varepsilon_{medi}}\sin\theta \quad (7)$$

In this case, m and n are positive or negative integers.

[Mathematical Expression 8]

$$k_{spp,medi} + mK_x + nK_y = k_{spp,sub} \quad (8)$$

When Formula (8) is satisfied, the intensity of light emitted from light source device 100 becomes the highest.

The wave number of surface plasmons on the interface between plasmon excitation layer 41 and the medium that contacts plasmon excitation layer 41, $k_{spp,medi}$, and the wave number of surface plasmons on the interface between carrier generation layer 11 and plasmon excitation layer 41, $k_{spp,sub}$

[Mathematical Expression 9]

$$k_{spp,medi} = \frac{\omega}{c}\sqrt{\frac{\varepsilon_{metal}\varepsilon_{medi}}{\varepsilon_{metal}+\varepsilon_{medi}}} \quad (9)$$

[Mathematical Expression 10]

$$k_{spp,sub} = \frac{\omega}{c}\sqrt{\frac{\varepsilon_{metal}\varepsilon_{subi}}{\varepsilon_{metal}+\varepsilon_{sub}}} \quad (10)$$

are represented by formula (9) and (10), respectively.

In this exemplary embodiment, a periodic structure (not shown) may be formed on the carrier generation layer 11 side of plasmon excitation layer 41.

As described above, according to the fifth exemplary embodiment, the same effect as the first to fourth exemplary embodiments can be obtained. In addition, since the number of layers of the directivity control layer according to the sixth exemplary embodiment is smaller than that according to the first to fourth exemplary embodiments, the number of manufacturing steps can be decreased.

Sixth Exemplary Embodiment

Figure 11:
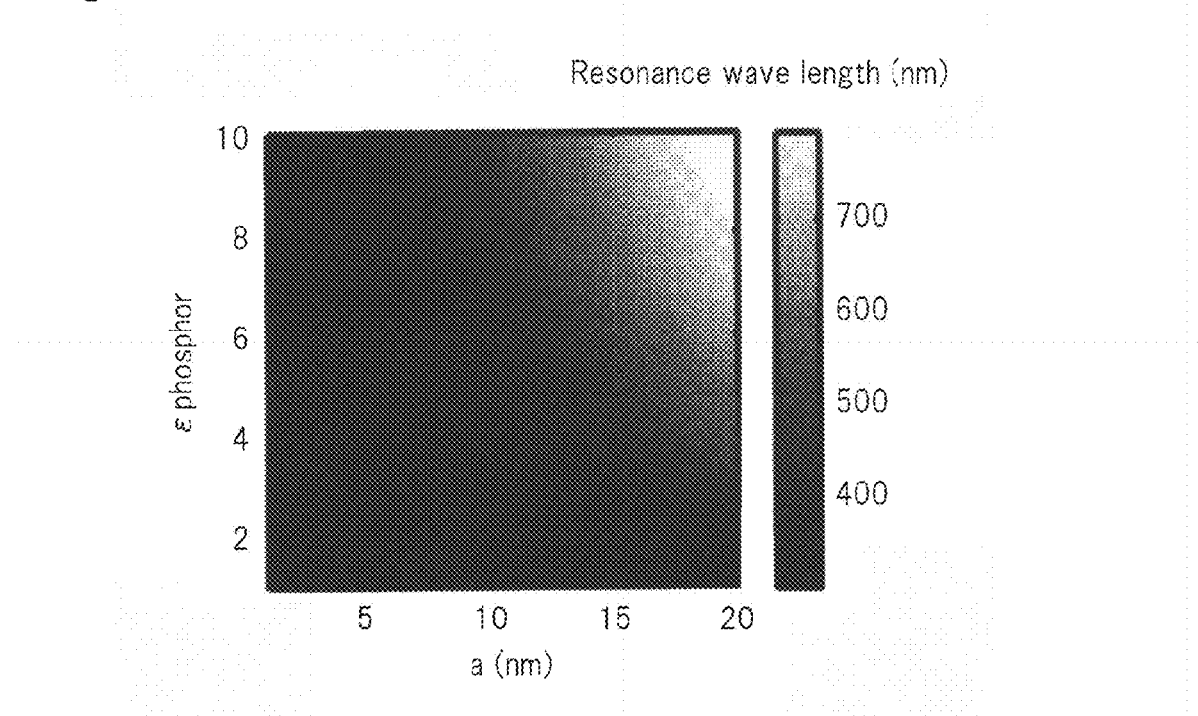
FIG. 11 is a contour line diagram that represents the relationship between individual parameters of an optical device and a plasmon resonance wavelength in the case where the material of metal particles is Al.

Next, the structure of a projection type display device as an example of a device that uses light source device 100 will be described. FIG. 11 is a schematic diagram showing the projection type display device according to a sixth exemplary embodiment of the present invention.

As shown in FIG. 11, an LED projector according to this exemplary embodiment has red (R) light source device 100r, green (G) light source device 100g, blue (B) light source device 100b; illumination optical systems 120r, 120g, and 120b in which light emitted from light source devices 100r, 100g, 100b enters; and light valves 121r, 121g, and 121b as modulation devices into which that passes through illumination optical systems 120r, 120g, and 120b enters. In addition, the projection type display device has cross dichroic prism 122 that combines R, G, and B light components that are modulated by light valves 121r, 121g, and 121b; and projection optical system 123 including a projection lens (not shown) that projects light emitted from cross dichroic prism 122 on a projection surface such as a screen.

The projection type display device has a structure applied to a so-called three panel type projector. Illumination optical systems 120r, 120g, and 120b each have a rod lens (not shown) that equalizes, for example, luminance. Light valves 121r, 121g, and 121b each have, for example, a liquid crystal display panel and a DMD (Digital Micromirror Device). It should be appreciated that the light source device according to the foregoing exemplary embodiment can be applied to a single panel type projector.

When light source device 100 is applied to the projection type display device according to this exemplary embodiment, the luminance of projected images can be improved.

It should be appreciated that light source device 100 can be applied to a device other than a projection type display device. For example, light source device 100 may be applied to a direct type light source for a liquid crystal display (LCD) panel, a backlight for a portable phone, a PDA (Personal Data Assistant), or the like. In addition, light source device 100 may be applied to a light source device for various types of sensing devices.

Working Example 1

Next, the absorption efficiency of incident light of optical device 1 will be evaluated. In the following, it is assumed that the wave length of incident light of carrier generation layer 11 is 405 nm, the imaginary part of the dielectric constant of phosphor at a wave length of 405 nm is 0.2, and the filling rate of metal particles 14 is 50%. The absorption efficiency is a magnification of the value in the case where metal particles 14 are present to the value in the case where metal particles 14 are not present. The filling rate of metal particles 14 is the ratio of metal particles 14 to the entire volume of carrier generation layer 11.

Figure 12:
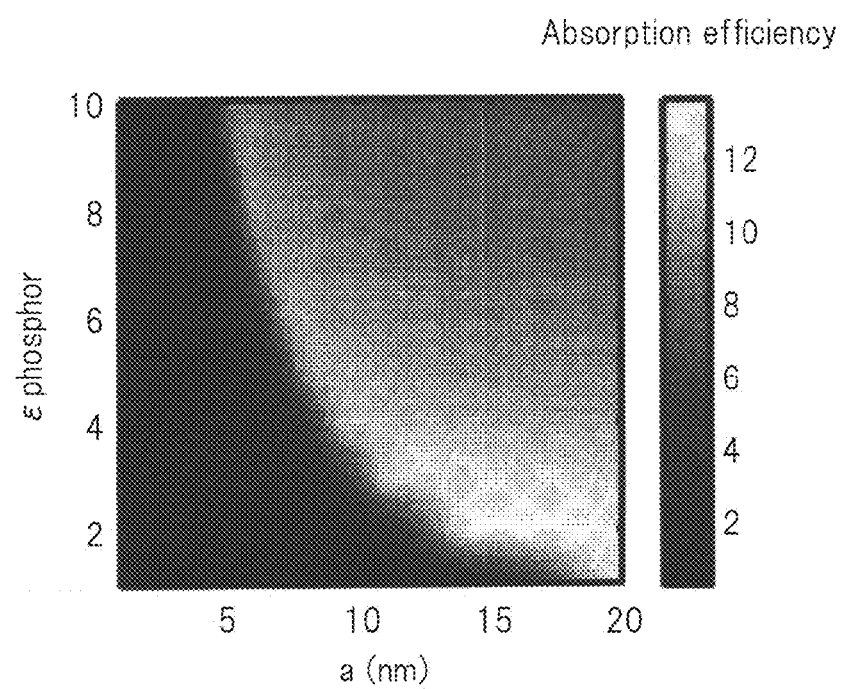
FIG. 12 is a contour line diagram that represents the relationship between individual parameters of an optical device and a light absorption efficiency in the case where the material of metal particles is Al.
Figure 13:
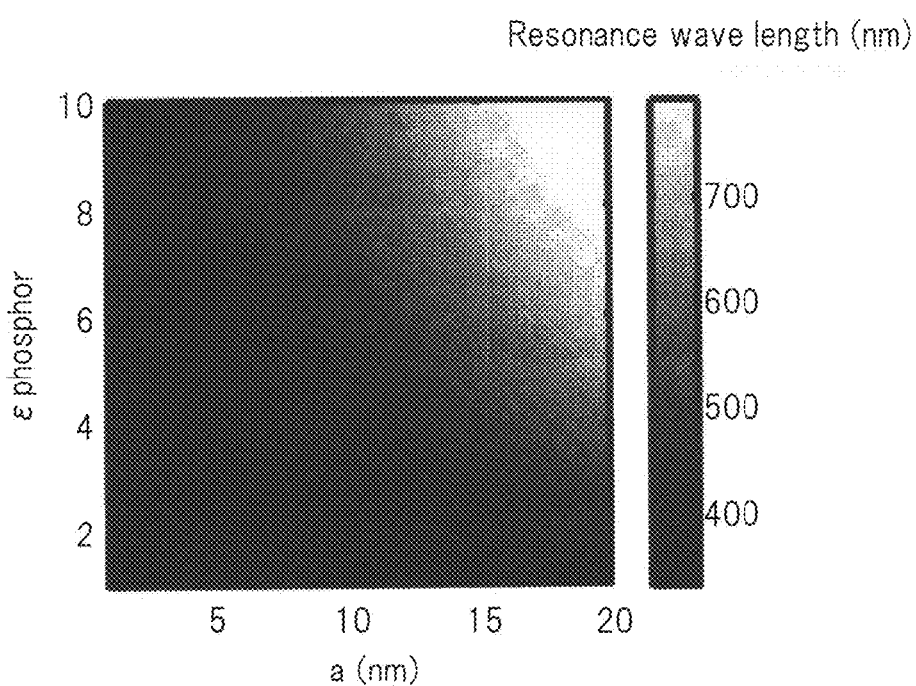
FIG. 13 is a contour line diagram that represents the relationship between individual parameters of an optical device and a plasmon resonance wavelength in the case where the material of metal particles is Ag.

If metal particles 14 are made of aluminum (Al), the relationship between the parameters of optical device 1 (specifically, radius a of metal particles 14 and specific dielectric constant $\epsilon_{phosphor}$ of carrier generation layer 11) and the plasmon resonance wave length of surface plasmons excited in metal particles 14 is represented in a contour line diagram of FIG. 12. The relationship between the parameters of optical device 1 and the absorption efficiency is represented in a contour line diagram of FIG. 13. In this case, assuming that radius a is 14 nm and specific dielectric constant $\epsilon_{phosphor}$ is 4, the absorption efficiency becomes 11 times. At this point, the absorption length that is the distance from the incident surface of carrier generation layer 11 to the position at which the intensity of incident light becomes 1/e is 45 nm. The thickness of carrier generation layer 11 that can absorb light whose intensity is 1/e of that of incident light is 22.5 nm.

Figure 14:
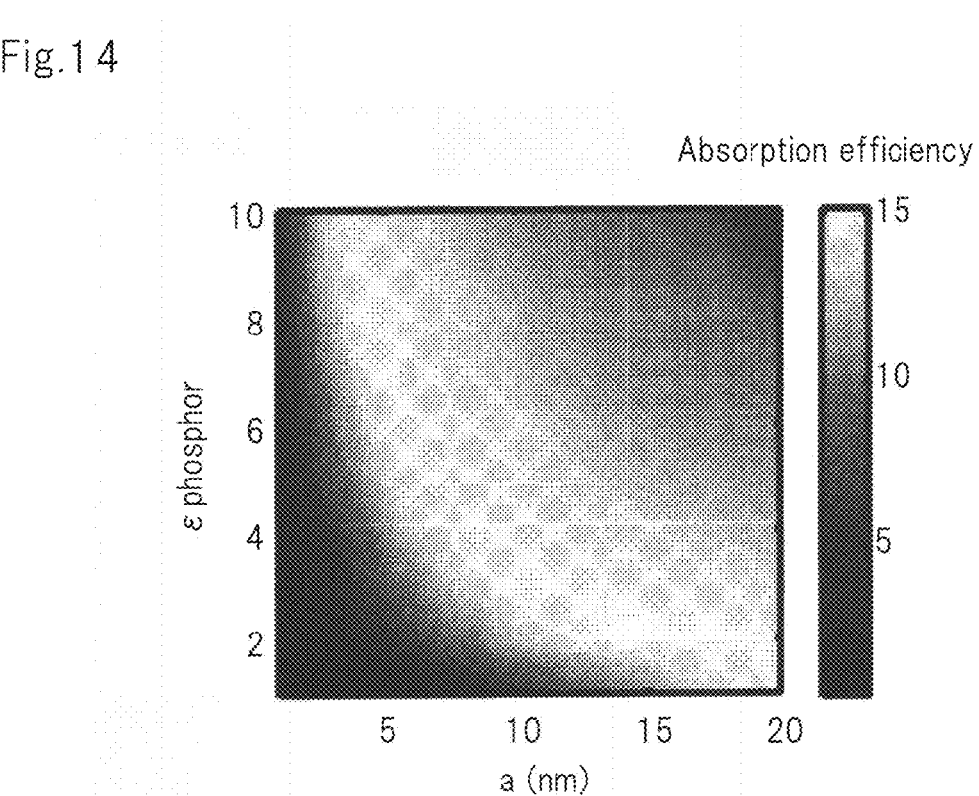
FIG. 14 is a contour line diagram that represents the relationship between individual parameters of an optical device and a light absorption efficiency in the case where the material of metal particles is Ag.
Figure 15:
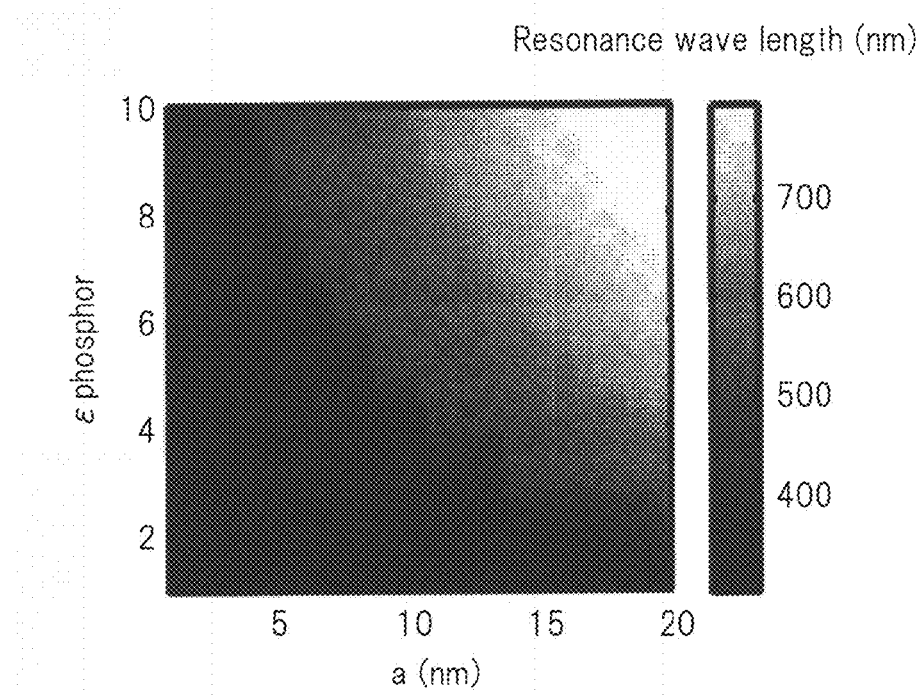
FIG. 15 is a contour line diagram that represents the relationship between individual parameters of an optical device and a plasmon resonance wavelength in the case where the material of metal particles is Au.

If metal particles 14 are made of silver (Ag), the relationship between the parameters of optical device 1 and the plasmon resonance wave length is represented in a contour line diagram of FIG. 14. The relationship between the parameters of optical device 1 and the absorption efficiency is represented in a contour line diagram of FIG. 15. In this case, assuming that radius a is 11 nm and specific dielectric constant $\epsilon_{phosphor}$ is 4, the absorption efficiency becomes 14 times. At this point, the absorption length becomes 35 nm. The thickness of carrier generation layer 11 that can absorb light whose intensity is 1/e of that of incident light is 17.5 nm.

Figure 16:
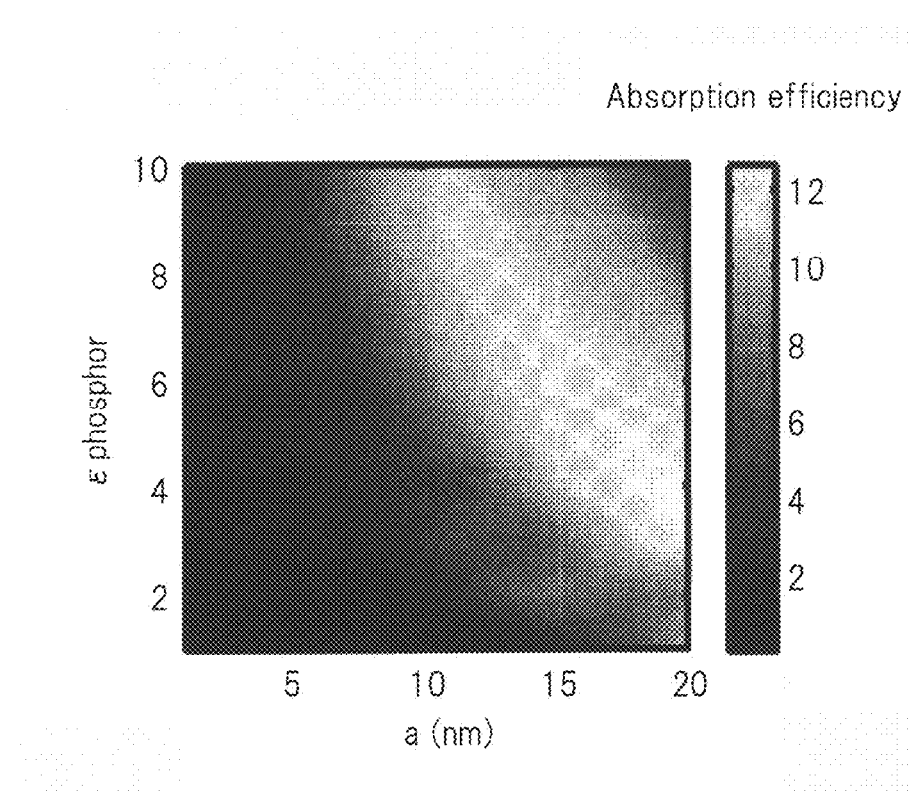
FIG. 16 is a contour line diagram that represents the relationship between individual parameters of an optical device and a light absorption efficiency in the case where the material of metal particles is Au.

If metal particles 14 are made of gold (Au), the relationship between the parameters of optical device 1 and the plasmon response wave length is represented in a contour line diagram of FIG. 16. The relationship between the parameters of optical device 1 and the absorption efficiency is represented in a contour line diagram of FIG. 17. In this case, assuming that radius a is 11 nm and specific dielectric constant $\epsilon_{phosphor}$ is 4, the absorption efficiency becomes 5 times. At this point, the absorption length becomes 76 nm. The thickness of carrier generation layer 11 that can absorb light whose intensity is 1/e of that of incident light is 38 nm.

As described above, even if the radius of metal particles 14 is as large as 10 nm, it is clear that the absorption efficiency becomes equal to or greater than 5 times. Even if the thickness of carrier generation layer 11 is as low as several ten nm, it can absorb light whose intensity is 1/e of that of incident light, therefore a plasmon coupling and emitting device having high efficiency and high luminance can be accomplished.

In each exemplary embodiment, the illustrated structures are just examples. Thus, the present invention is not limited to such structures.

With reference to the exemplary embodiments, the present invention has been described. However, it should be understood by those skilled in the art that the structure and details of the present invention may be changed in various manners without departing from the scope of the present invention.

The present application claims a priority based on Japanese Patent Application JP 2010-232825 filed on Oct. 15, 2010, the entire contents of which are incorporated herein by reference in its entirety.

What is claimed is:
1. An optical device, comprising:
   a phosphor layer that causes fluorescence to occur with incident light;
   a plasmon excitation layer that excites first surface plasmons with said fluorescence, said plasmon excitation layer being laminated on said phosphor layer, and
   an exit section that emits said first surface plasmons or light that occurs on an opposite surface of a contact surface of said phosphor layer of the plasmon excitation layer to the outside as emitting light,
   wherein said phosphor layer contains metal particles that excite second surface plasmons with said incident light.
2. The optical device as set forth in claim 1,
   wherein the concentration of said metal particles in a plasmon excitation layer side region that is apart from a center of said phosphor layer is greater than that in an opposite side region of said plasmon excitation layer that is apart from the center of said phosphor layer.

3. The optical device as set forth in claim 2,
wherein said metal particles are dispersed only in said plasmon excitation layer side region that is apart from the center of said phosphor layer.

4. The optical device as set forth in claim 1, wherein a dielectric layer is formed between said phosphor layer and said plasmon excitation layer.

5. The optical device as set forth in claim 1, wherein an effective dielectric constant of an incident side portion including an entire structure laminated on said contact surface of said phosphor layer of said plasmon excitation layer is greater than that of an exit side portion including an entire structure laminated on said opposite surface of said contact surface of said phosphor layer of said plasmon excitation layer and a medium that contacts said exit section.

6. The optical device as set forth in claim 1,
wherein an effective dielectric constant of an incident side portion including an entire structure laminated on said contact surface of said phosphor layer of said plasmon excitation layer is lower than that of an exit side portion including an entire structure laminated on said opposite surface of said contact surface of said phosphor layer of said plasmon excitation layer and a medium that contacts said exit section.

7. The optical device as set forth in claim 2,
wherein an effective dielectric is determined based on a distribution of dielectric constants of dielectric substances of an incident side portion or an exit side portion and on a distribution of surface plasmons for directions perpendicular to an interface of said plasmon excitation layer of said incident side portion or an exit side portion.

8. The optical device as set forth in claim 1,
wherein said exit section is a wave number vector conversion layer that is laminated on said plasmon excitation layer and that converts a wave number vector of first surface plasmons or light that occurs on an opposite side surface of said contact surface of said phosphor layer of said plasmon excitation layer into light.

9. The optical device as set forth in claim 1,
wherein said exit section has a periodic structure formed on said plasmon excitation layer.

10. The optical device as set forth in claim 1, further comprising:
a light guide that propagates light emitted from a light emitting device to said phosphor layer,
wherein said phosphor layer is laminated on said light guide.

11. The optical device as set forth in claim 1,
wherein said metal particles are comprised of gold, silver, aluminum, or an alloy containing one or more thereof.

12. A light source device, comprising:
an optical device as set forth in claim 1; and
a light emitting device that emits light to said optical device.

13. A projection display device, comprising:
a light source device as set forth in claim 12;
a modulation device that modulates light emitted from said light source device and emits the modulated light; and
a projection optical system that projects light emitted from said modulation device so as to display an image corresponding to the modulated light.

14. The optical device as set forth in claim 1, wherein a dielectric layer is formed between said exit section and said plasmon excitation layer.

* * * * *